United States Patent [19]

Adams et al.

[11] Patent Number: 4,530,516

[45] Date of Patent: Jul. 23, 1985

[54] ALUMINUM INFLATOR WITH STEEL CENTER-TIE

[75] Inventors: Gary V. Adams, Perry; Scott R. Anderson, Tremonton; Donald R. Lauritzen, Hyrum, all of Utah

[73] Assignee: Morton Thiokol Inc., Chicago, Ill.

[21] Appl. No.: 629,023

[22] Filed: Jul. 9, 1984

[51] Int. Cl.³ .............................................. B60R 21/08
[52] U.S. Cl. ..................................... 280/741; 280/735
[58] Field of Search ............... 280/728, 734, 735, 736, 280/740, 741

[56] References Cited

U.S. PATENT DOCUMENTS

| | | | |
|---|---|---|---|
| 3,958,949 | 5/1976 | Plantif et al. | 280/728 |
| 3,984,126 | 10/1976 | Goetz et al. | 280/740 |
| 4,116,466 | 9/1978 | Gehrig | 280/736 |
| 4,131,299 | 12/1978 | Ono et al. | 280/736 |
| 4,203,787 | 5/1980 | Kirchoff et al. | 149/35 |
| 4,296,084 | 10/1981 | Adams et al. | 423/351 |
| 4,306,499 | 12/1981 | Holmes | 102/202.4 |
| 4,369,079 | 1/1983 | Shaw | 149/2 |

FOREIGN PATENT DOCUMENTS 2022194 12/1979 United Kingdom ............... 280/740

Primary Examiner—Joseph F. Peters, Jr.
Assistant Examiner—Kenneth R. Rice
Attorney, Agent, or Firm—Gerald K. White

[57] ABSTRACT

A reduced weight housing construction for a gas generator or inflator comprises stamped aluminum diffuser and base primary pressure components and a hollow steel center-tie member that is provided at the center of the housing with the inflator initiator assembly mounted therein and which with one electron beam weld provides both a structural tie for the inflator and initiator retention.

8 Claims, 2 Drawing Figures

ALUMINUM INFLATOR WITH STEEL CENTER-TIE

BACKGROUND OF THE INVENTION

1. Field of the Invention

This invention relates to an improved housing construction for a gas generator or inflator that utilizes the combustion of a solid gas generant composition for the rapid generation of a clean gas that is particularly useful for rapidly filling vehicle inflatable cushion restraint systems for the protection of the occupants from severe impact and possible injury during a collision.

2. Description of the Prior Art

Gas generators that utilize combustible solid gas generant compositions are known in the prior art. Common features of such generators that are used for the inflation of cushion restraint systems are the inclusion in a housing of a gas generant composition containing a pelletized alkali metal azide and means to filter and to cool the gas positioned between the gas generant composition and gas discharge orifices, as defined by the housing. Such compositions are considered advantageous for use in vehicle inflatable cushion restraint systems because the product of combustion is mainly nitrogen, an inert gas, and the speed of reaction or burning thereof, upon ignition, may be selected to be such as to effect the generation of gas at a very rapid rate but without detonation. Such constituents that burn rapidly, however, usually burn with a temperature of about 1000° C., and develop a pressure in the housing in excess of 2000 psia.

Accordingly, among the problems associated with such prior art gas generators has been the containment of the high pressure gas producing reaction within a housing of acceptable weight and bulk. For example, U.S. Pat. No. 3,984,126 for an INFLATOR FOR VEHICLE OCCUPANT RESTRAINT SYSTEM, U.S. Pat. No. 4,116,466 for a FLUID SUPPLY FOR OCCUPANT RESTRAINT SYSTEM, and U.S. Pat. No. 4,296,084 for METHOD OF AND APPARATUS FOR GAS GENERATION all disclose the use of steel for the primary pressure chamber components of a gas generator in order to contain the pressure generated by the gas generant as it burns at near explosive rates. Current production gas generators for inflating automobile safety air bags also utilize steel structural components. Such gas generators may weigh between 900 to 1200 grams. When installed in a steering wheel hub in an automobile they add significant weight to the steering column. Steering column weight and generator vibration impact would both be reduced with a lighter weight gas generator. A large weight savings may be accomplished if the steel structural components of the prior art gas generators or inflators were converted or replaced by aluminum components. Forms of inflators that utilize aluminum for the housing structure are disclosed and claimed in copending application bearing Ser. No. 595,774, filed on April 2, 1984, by Wilbur J. Ahlf et al for INERTIA WELDED INFLATOR and in copending application bearing Ser. No. 595,803, filed on April 2, 1984 by Gary V. Adams et al for AUTO IGNITION DEVICE, both of which applications are assigned to the assignee of the present invention. However, the use of aluminum components in a gas generator presents a major problem. This is for the reason that at elevated temperatures in the 650° F. (343° C.) range, aluminum degrades. As a result, a gas generator comprised of aluminum components loses so much strength at such elevated temperatures that it probably would not pass the "bonfire" tests that such pyrotechnic devices must undergo without fragmentation in order to qualify for a low hazard shipping classification.

SUMMARY OF THE INVENTION

A primary object of the present invention is to provide a gas generator that is substantially reduced in weight over presently available gas generators.

Another object of the present invention is to provide a gas generator of lighter weight than those of the prior art and which also retains sufficient structural strength at elevated temperatures to pass the tests that have been established for classification as a low hazard shipping item.

Another object of the present invention is to provide a reduced weight gas generator in order to present less of a hazard to vehicle occupants, particularly the driver when the gas generator is used for inflating automobile safety air bag.

Another object of the present invention is to provide a reduced weight gas generator so as to lessen inflator vibration impact on an automobile steering column. The lower vibration impact allows the steering column weight to be reduced thereby reducing the vehicle weight and contributing to lower vehicle gasoline consumption per mile while still providing a viable inflatable crash protection system for the vehicle.

Still another object of the present invention is to provide a practicable reduced weight, low cost and easily assembled gas generator which strikes a compromise between the stronger steel gas generator of the prior art and a lighter all aluminum gas generator.

A specific object of the invention is to provide a reduced weight housing construction for a gas generator or inflator comprising aluminum diffuser and base primary pressure chamber components and a steel center-tie member welded in the center of the housing construction to provide a strong structural tie for the aluminum members of the housing.

In accomplishing these and other objectives of the invention, there is provided a housing construction for gas generators or inflators using solid fuel and incorporating suitable filters for the production of clean nitrogen gas substantially free of particulate to inflate vehicle inflatable cushion restraint systems and including ignition means for igniting the solid fuel including first and second generally cylindrical mating aluminum shells, the first shell comprising a diffusing means for the inflator and the second shell comprising a base. The shells are so sized that the second shell partially fits within and abuts against a shoulder provided on the inner cylindrical wall of the first shell, the cylindrical axis of the second shell coinciding with the cylindrical axis of the first shell when the second shell is so positioned with respect to the first shell.

With the first and second shells so positioned and attached together there is formed an enclosure for containing the inflator solid fuel and filters. Each of the first and second shells has a central opening on the cylindrical axis thereof, whereby, with the first and second shells positioned, as described, the central openings are in alignment. A steel retaining means is provided for retaining the first and second shells in this positional relationship. This strengthens the housing construction and increases its capacity to withstand internal pressures at elevated temperatures to which it may be subjected. The steel retaining means is rigidly attached to the second shell and extends through both of the central openings. The steel retaining means is hollow and encloses the ignition means for the inflator. A feature of the invention is that a single electron beam weld provides both a structural tie for the housing and retention of an initiator assembly comprising the ignition means.

BRIEF DESCRIPTION OF THE DRAWINGS

Having summarized the invention, a detailed description follows with reference being made to the accompanying drawings which form part of the specification, of which.

DESCRIPTION OF THE PREFERRED EMBODIMENT

Figure 1:
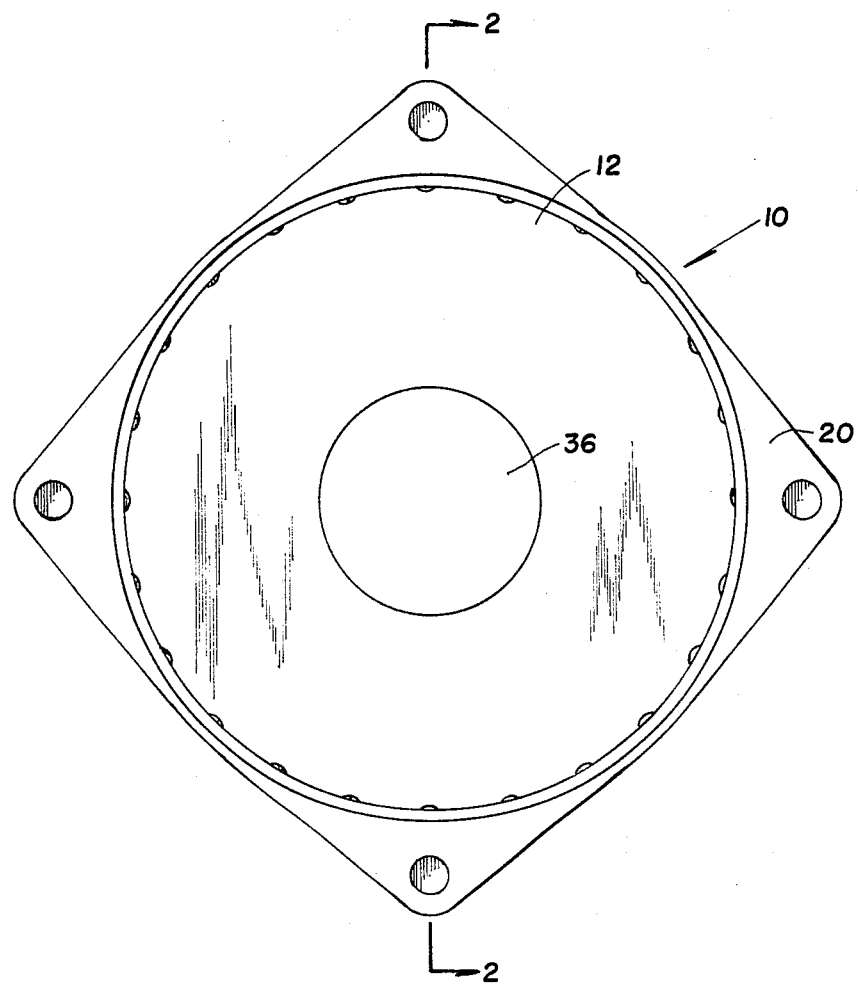
FIG. 1 is a top plan view of the gas generator housing construction according to the invention.
Figure 2:
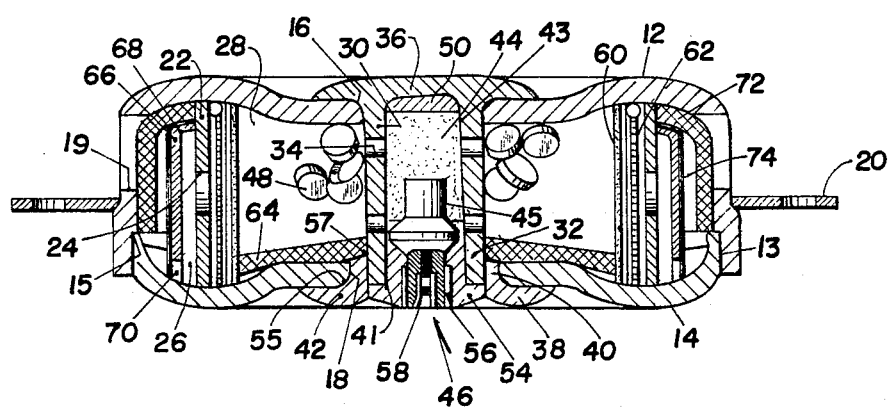
FIG. 2 is a cross sectional view of the gas generator taken along the lines 2—2 of FIG. 1.

The gas generator or inflator assembly according to the present invention has a generally cylindrical external outline, as shown in FIGS. 1 and 2, and includes a housing construction, generally designated by the numeral 10, comprising three primary structural components. Two of these components comprise an upper shell or diffuser 12 and a lower mating shell or base 14. Both of these components are stamped from aluminum and are welded together, with diffuser 12 embracing base 14, as shown in FIG. 2, by a method known in the art of welding as electron beam welding. Desirably a ring seal 13 may be provided at the interface of diffuser 12 and base 14, specifically between the peripheral edge of base 14 and a shoulder 15 that is formed inwardly of the peripheral edge of diffuser 12, to provide a seal there between. As stamped, the diffuser 12 and base 14 are each formed with a centrally located circular opening, specifically opening 16 in diffuser 12 and opening 18 in base 14. Diffuser 12, as shown, is provided with a plurality of circumferentially spaced exit ports 19. Welded to the diffuser 12 is an interface attachment flange 20 which is used to attach the inflator assembly to a vehicle the occupants of which are to be protected, for example, to the hub of the steering wheel of the vehicle, for the protection of the driver.

Enclosed within the housing construction 10 is a free standing cylindrical member 22 having a plurality of circumferentially spaced ports or orifices 24. One end of member 22 engages an inner concave surface of the diffuser 12 and the other and opposite end thereof engages an inner concave surface of the base 14. The engagement, in each case, is tight. There is thus formed an outer annular chamber 26 and an inner cylindrical chamber 28.

The third structural component of the housing construction 10 comprises an elongated steel center-tie member 30 which as described further hereinafter, is rigidly attached to the center of the housing 10 and provides a strong structural tie for the diffuser 12 and the base 14. Center-tie member 30 has a hollow cylindrical body 32 that is perforated, being provided with circumferential ports or orifices 34 therein, and extends through the respective center openings 18 and 19 in diffuser 12 and base 14 with the cap 36 held in tight engagement with the upper surface of diffuser 12. A depending cylindrical wall 40 of a disc-shaped steel retaining ring or member 38 fits into opening 18 of the base 14 and over the lower end of the body 32, as seen in FIG. 2, with a flange portion 42 of the retaining ring 38 held in tight engagement with the lower surface of the base 14.

Contained within opening 41 in the lower end of the center-tie member 30 is an igniter charge assembly 46 comprising a rupturable aluminum container 43 containing ignition material or igniter granules 44. Container 43 may be hermetically sealed against moisture and has a recess or cavity 45 formed in the bottom thereof. A retainer plug 50 is provided for retaining the igniter granules 44 within the container 43.

Gas generant pellets 48 are contained in the annular or toroidal chamber 28 that is formed in the housing construction 10 between the center-tie member 30 and the free standing cylindrical member 22. The wall of the aluminum container 43 forms a barrier foil that separates the gas generant pellets from the igniter granules 44 in the initiator assembly 46. If desired, the interior opening 41 in the center-tie body 32 may be lined with a separate barrier foil (not shown) for further separating the igniter granules 44 from the gas generant pellets 48. The ports or orifices 34 in body 32 of center-tie member 30 provide passageways for the hot gases that are generated by the igniter granules 44, upon ignition thereof, for causing ignition of the gas generant pellets 48 in the surrounding toroidal chamber 28. Chamber 28, for convenience, is referred to hereinafter as the combustion chamber.

The initiator assembly 46 is retained in the interior opening 41 of the center-tie member 30 by initiator housing member 54 which is rigidly attached to the center-tie member 30. Since the outside diameter of the initiator housing member 54 is substantially the same as that of the outside diameter of the cylindrical portion of body 32 of the center-tie member 30, a retaining ring 38 is required in order to provide the retaining and strengthening function of the housing 10. Retaining ring 38 is rigidly attached to a flange 52 on the initiator housing 54 and to the center-tie body member 32. The rigid attachments are weldments that are made by an electron beam welding process.

Retaining ring 38, as previously mentioned, is disc-shaped and includes a flange 42 and a dependent cylindrical wall 40. The outside surface and end of the cylindrical body 32 of the center-tie member 30 is welded to the interior surface of the depending wall 40 of the retaining ring 38, and flange 52 on the initiator housing 54 is rigidly attached to the retaining ring 38 within the central opening thereof. When assembled the retaining center-tie member 30 acts to hold housing members 12 and 14 together by means of opposing flanges, one flange being the flange 42 and the other a flange on cap 36. Desirably, prior to assembly, two circumferential beads of RTV sealant 55 and 57 may be applied to the interface between the opening 18 in the base 14 of the housing 10 and the retaining ring 38 at the flange 42 and depending cylindrical wall 40.

The initiator assembly 46 includes a conventional electric squib 56 having upper and lower conically shaped portions. Squib 56 includes a pair of energizing electrical terminals 58 that are adapted for plug-in connection to external crash sensor means (not shown). The upper end of squib 56 is positioned in the recess 45 of container 43 which, as shown, has a complementary conically shaped surface at its lower end for seating the conically shaped upper portion of the squib 56. Squib 56 is held snugly in this position by the initiator housing member 54 which engages the lower end thereof. Squib 56 includes lead wires (not shown) that extend through ferrite beads (not shown) within the initiator assembly 46 in order to render the squib 56 substantially insensitive to extraneous radio frequency that may pervade the environment surrounding the gas generator. Desirably, in order to render the electric squib additionally insensitive to extraneous radio frequency energy and electrostatic potentials, an arrangement may be utilized as disclosed U.S. Pat. No. 4,306,499 issued on Dec. 22, 1981 for an ELECTRIC SAFETY SQUIB.

Although various pyrotechnic materials may be employed for the igniter granules 44 in initiator assembly 46, a preferred material is a granular mixture of 25% by weight of boron and 75% by weight of potassium nitrate. This mixture has been found to burn with a very hot flame that is suitable for igniting the solid fuel gas generant pellets 48 in combustion chamber 28.

Pellets 48 in combustion chamber 28 may be any one of a number of compositions meeting the requirements of burning rate, non-toxicity, and flame temperature. One composition that may be used is described in U.S. Pat. No. 4,203,787 granted to G. F. Kirchoff et al on May 20, 1980. Another composition that may be advantageously be utilized is that described in U.S. Pat. No. 4,369,079 granted to G. C. Shaw on Jan. 18, 1983.

The metal barrier foil including the wall of container 43 in the interior opening 41 of center-tie body 32 serves the dual purpose of retaining the granular pyrotechnic material 44 in the perforated chamber formed by center-tie body 32 and of insuring that the high temperature gases produced by the pyrotechnic material, upon firing of the squib 56, have sufficient pressure to permeate the gas generant composition pellets 48 thoroughly for efficient and sustained ignition before they are released by rupture of the container 43 and of any additional barrier foil that may have been provided for lining the interior opening of center-tie body 32.

In combustion chamber 28, gas generant pellets 48 are surrounded by an annular inner screen pack or combustion chamber filter 60. Inner screen filter pack 60 may desirably include a layer 62 of coarse screen adjacent to the inner surface of cylinder 22. A perforated, washer-like, pad cushion 64 of cerafiber material desirably may be provided for holding the gas generant pellets 48 in place and away from the inner surface of the base 14 and the end of the depending cylindrical wall 40 of the retaining ring 38, and for cushioning the gas generant pellets 48 against vibration.

In the outer annular chamber 26 an aluminum cylindrical deflector ring 66 is provided. Deflector ring 66 is formed with an inwardly directed curved flange 68 at its upper end and has a plurality of uniformly spaced exhaust openings or ports 70 adjacent the bottom end thereof. Deflector ring 66 is held in place by a diffuser screen assembly 72 the upper end of which engages a concave inner surface portion of diffuser 12 and is curved inwardly into overlapping engagement with the similarly curved upper end of deflector ring 66, the lower end of deflector ring 66 being in engagement with a concave inner surface portion of the base 14. The lower end of diffuser screen assembly 72 is positioned in engagement with an inner peripheral edge portion of base 14 adjacent the shoulder 15 on diffuser 12. Thus, the diffuser screen assembly 72 is held in place between the base 14 and diffuser 12. Diffuser screen assembly 72, as shown in FIG. 2, desirably may include a layer 74 of fine screen immediately adjacent deflector ring 66.

In accordance with the invention, the housing construction 10 provides a structure for containing the high pressure inflation gases that are produced by combustion of the gas generant pellets 48. Functioning of the inflator 10 begins with an electrical signal from a crash sensor (not shown) to the initiator assembly 46. The squib 56 fires into the igniter granules 44 which burn with the development of hot gases under pressure that burst through the wall of container 43 and flows through the ports 34 in the center-tie body 32 and into the combustion chamber 28. The hot igniter gases ignite the gas generant pellets 48 which release the nitrogen inflator gases. These gases flow through the inner screen filter pack 60 and radially outward through the circumferentially spaced ports 24 in the cylindrical member 22. Member 22, as previously mentioned, is held tightly between diffuser 12 and base 14, and in cooperation with the inner screen filter pack 60 regulates the flow of gases from the combustion chamber 28 to the diffuser screen assembly 72. The filter pack 60, additionally, serves to cool the inflator gases and remove particulate therefrom. After the exhaust gases pass through the combustion chamber 28, they are turned down by the deflector ring 66 and turned again by the base 14 so that they come up into the diffuser screen assembly 72. This turning of the exhaust gases from the combustion chamber 28 helps to remove particulate so that the gases are cleaner as they exit through the ports 19 of the diffuser 12 and into the air bag (not shown) of a vehicle safety restraint system.

By way of illustration and not limitation it is noted that in an operative embodiment of FIG. 1 of the invention, the external diameter of the generator 10 is 10.99 centimeters and its height is 6.53 centimeters.

Thus, in accordance with the invention, there is provided an aluminum inflator for vehicle inflatable restraint systems that differs in a number of important respects from those of the prior art and constitute an improvement thereon. Principal advantages of the aluminum inflator of the present inventions are:

1. A 20–40% reduction in weight over the inflators of the prior art while still retaining a strong steel tie for meeting elevated temperature tests that have been established for qualifying the inflator as a low hazard shipping item.
2. Simple construction for low cost components and assembly:
    a. A stamped aluminum base.
    b. A stamped aluminum diffuser with electron beam welded flange.
    c. A steel center-tie with one electron beam weld to provide both a structural tie and initiator assembly retention.

What is claimed is:

1. A housing construction for inflators using solid fuel for the generation of gas to inflate vehicle inflatable cushion restraint systems and including ignition means for igniting the solid fuel comprising:

first and second structural components comprising a diffuser means and a base means, said diffuser means comprising a first cylindrical aluminum shell having a first axis, said shell having a plurality of circumferentially spaced diffuser ports and a first central opening on the first axis, said base means comprising a second cylindrical aluminum shell having second axis, said second shell being sized to mate with said first shell to form an enclosure for containing the inflator solid fuel and having a second central opening on the second axis, said base means being attached to said diffuser means with the first axis of said diffuser means in alignment with the second axis of said base means and with the first and second central openings in axial alignment, an initiator housing assembly for effecting ignition of the inflator solid fuel, elongated cylindrical center-tie retaining means extending through the first and second central openings, said center-tie retaining means being made of steel and characterized in retaining its strength at elevated temperatures in a range at which the aluminum of which said first and second shells is made tends to degrade, said retaining means having an integrally formed cap means at a first end for tight engagement with said first aluminum shell at a region thereof adjacent the first central opening, said retaining means being hollow with perforated walls and having an opening at a second end, said initiator housing assembly being inserted in the opening at the second end of said retaining means, and attaching means for rigidly attaching the second end of said retaining means to said second aluminum shell and for retaining said initiator housing assembly within said steel retaining means.

2. A housing construction as defined in claim 1 wherein said attaching means includes a steel retaining ring having a depending wall that fits into the second central opening of the second shell between the second shell and the center-tie retaining means and having a flange portion in tight engagement with said second shell at a region thereof adjacent the second central opening.

3. A housing construction as defined in claim 2 wherein a suitable sealant for gas sealing is applied to the interfaces between the depending wall of said retaining ring and said second shell and center-tie retaining means.

4. A housing construction as defined in claim 3 wherein said initiator housing assembly includes a flange means that is positioned within said retaining ring into contact with the end of said center-tie retaining means whereby a structural tie of said first and second shells by said center-tie retaining means and retention of said initiator housing assembly within said center-tie retaining means may be effected with a single electron beam weld.

5. A housing construction as defined in claim 4 wherein said first shell includes a shoulder inwardly of the cylindrical wall thereof and said second shell is positioned within said first shell with a peripheral edge of said second shell in tight engagement with said shoulder.

6. A housing construction as defined in claim 5 wherein said first and second shells positioned as defined are electron beam welded together.

7. A housing construction as defined by claim 6 further including a perforated free standing cylindrical aluminum member positioned within the enclosure formed by said first and second shells and held tightly between said first and second shells with the axis thereof substantially coincident with the axis of said shells, the diameter of said cylindrical member being such with respect to the diameters of said shell and with respect to the diameter of said center-tie means that there are formed an outer annular filtering and diffusing chamber and an inner annular combustion chamber, said cylindrical member having ports provided therein.

8. A housing construction as defined by claim 7 further including gas generant means, first filter means and pad cushion means provided in said combustion chamber, said pad cushion being positioned between said second shell and said gas generant means, and said first filter means being positioned against said free standing cylindrical member in surrounding relationship with said gas generant means, and further including second filter means and a deflector ring, said deflector ring being provided in spaced relation between said free standing cylindrical member and said second filter means and arranged to deflect toward and against said second shell gases that are passed from the combustion chamber through the perforations in said free standing cylindrical member, such gases being turned and deflected by said second shell into said second filter means whereby particulate is removed from the gases and the gases are cleaner as they exit from the diffuser ports of said first shell.

* * * * *